United States Patent
Dawidziuk et al.

(10) Patent No.: US 10,670,218 B2
(45) Date of Patent: Jun. 2, 2020

(54) ELECTRICAL DEVICE FOR A VEHICLE RUNNING BOARD

(71) Applicant: Tyco Electronics Canada ULC, Markham (CA)

(72) Inventors: Jaroslaw Henryk Dawidziuk, Whitby (CA); Dragos N. Luca, Toronto (CA)

(73) Assignee: TYCO Electronics Canada ULC, Markham (CA)

(*) Notice: Subject to any disclaimer, the term of this patent is extended or adjusted under 35 U.S.C. 154(b) by 243 days.

(21) Appl. No.: 15/939,544

(22) Filed: Mar. 29, 2018

(65) Prior Publication Data

US 2019/0301698 A1 Oct. 3, 2019

(51) Int. Cl.
*F21S 41/50* (2018.01)
*F21S 41/24* (2018.01)
*F21S 41/20* (2018.01)
*B60Q 1/32* (2006.01)
*B60Q 1/26* (2006.01)
*F21V 23/00* (2015.01)
*B60R 13/00* (2006.01)
(Continued)

(52) U.S. Cl.
CPC .......... *F21S 41/50* (2018.01); *B60Q 1/0011* (2013.01); *B60Q 1/2607* (2013.01); *B60Q 1/2696* (2013.01); *B60Q 1/323* (2013.01); *B60R 13/005* (2013.01); *F21S 41/00* (2018.01); *F21S 41/151* (2018.01); *F21S 41/24* (2018.01); *F21S 41/285* (2018.01); *F21V 23/003* (2013.01); *G02B 6/0001* (2013.01); *G09F 13/06* (2013.01); *G09F 13/18* (2013.01); *G09F 21/04* (2013.01); *F21W 2102/40* (2018.01); *F21W 2104/00* (2018.01); *F21Y 2115/10* (2016.08); *G09F 2013/044* (2013.01); *G09F 2013/049* (2013.01)

(58) Field of Classification Search
CPC .......... F21S 41/50; F21S 41/24; F21S 41/285; F21S 41/151; F21S 41/00; B60Q 1/323; B60Q 1/2696; B60Q 1/2607; B60Q 1/0011; F21V 23/003; B60R 13/005; G02B 6/0001; G09F 13/06; G09F 13/18; G09F 21/04
See application file for complete search history.

(56) References Cited

U.S. PATENT DOCUMENTS

2008/0037266 A1 2/2008 Cunnien
2009/0251920 A1 10/2009 Kino et al.
(Continued)

FOREIGN PATENT DOCUMENTS

JP 2015221657 A 12/2015

OTHER PUBLICATIONS

International Search Report, International Application No. PCTIB2019/052090, International Filing Date, Mar. 14, 2019.

*Primary Examiner* — Thomas M Sember

(57) ABSTRACT

An electrical device for a vehicle includes a housing having an upper portion and a lower portion. An upper light source attaches to the upper portion and a light guiding element attaches to the upper portion to receive the upper light from the upper light source and direct outgoing light in a substantially uniform direction. A display attaches to the upper portion to receive the outgoing light for illumination of the display. A lower member couples with the lower portion. A lower light source attaches to the lower member. A collimator attaches to the lower member to receive incoming light from the lower light source and change directions of the incoming light to a collimated beam. A lens element attaches to the lower portion to direct the collimated beam at a target.

20 Claims, 3 Drawing Sheets

(51) Int. Cl.
*F21S 41/151* (2018.01)
*F21S 41/00* (2018.01)
*F21V 8/00* (2006.01)
*G09F 13/06* (2006.01)
*G09F 13/18* (2006.01)
*B60Q 1/00* (2006.01)
*G09F 21/04* (2006.01)
*F21W 102/40* (2018.01)
*F21W 104/00* (2018.01)
*F21Y 115/10* (2016.01)
*G09F 13/04* (2006.01)

(56) References Cited

U.S. PATENT DOCUMENTS

2012/0280528 A1  8/2012  Dellock et al.
2015/0197180 A1  7/2015  Salter et al.

ELECTRICAL DEVICE FOR A VEHICLE RUNNING BOARD

BACKGROUND OF THE INVENTION

The subject matter herein relates generally to an electrical device for a vehicle running board, and more specifically, a lighting assembly for a vehicle running board.

Running boards for vehicles often include electrical lighting devices for safety and aesthetic purposes. Typically, running boards extend alongside the vehicle frame between the front wheel well to the rear wheel well and below the door openings to provide a step for aiding passengers in entry or exit of the vehicle. Lighting assemblies are coupled with the running boards for both functional and decorative purposes. For example, lighting assemblies can illuminate the stepping surface of the running boards and/or trip or safety hazards on the ground surface below the running board. In another example, lighting assemblies can enhance the appearance of the vehicle by illuminating indicia or logos on the running board or vehicle.

Generally, multiple lighting assemblies are required to provide illumination for both safety and aesthetic purposes, and/or provide illumination at multiple locations. However, multiple lighting assemblies lead to increased cost, assembly, and installation. Accordingly, there is a need to maximize the illumination attributes of the lighting assembly, while minimizing the cost, assembly, and installation.

BRIEF DESCRIPTION OF THE INVENTION

In one embodiment, an electrical device for a vehicle is provided that includes a housing having a display mount and a lens barrel. An upper light source attaches to the display mount of the housing for emitting an upper light. A light guiding element mounts to the display mount of the housing and aligns with the upper light source to receive the upper light and direct outgoing light in a first emitting direction. A display attaches to the display mount of the housing and aligns with the light guiding element to receive the outgoing light for illumination of the display. A lower light source attaches to the lens barrel of the housing for emitting a lower light. A lens assembly attaches to the lens barrel of the housing. The lens assembly is configured to receive the lower light from the lower light source and direct outgoing light in a second emitting direction different from the first emitting direction.

In another embodiment, an electrical device for a vehicle is provided that includes a housing having an upper portion and a lower portion. An upper light source attaches to the upper portion of the housing for emission of an upper light. A light guiding element attaches to the upper portion of the housing and is configured to receive the upper light from the upper light source and direct outgoing light in a substantially uniform direction. A display attaches to the upper portion of the housing and is configured to receive the outgoing light from the light guiding element for illumination of the display. A lower light source attaches to the lower portion for emission of a lower light. A collimator attaches to the lower portion and is configured to receive incoming light from the lower light source and change directions of the incoming light received from the lower light source such that the outgoing light emanating from the collimator is a collimated beam. A lens element attaches to the lower portion of the housing and is configured to receive the collimated beam from the collimator and direct the collimated beam at a target.

In yet another embodiment, a lighting assembly for a vehicle running board is provided that includes a housing having an upper portion and a lower portion. An upper light source attaches to the upper portion of the housing and is configured for emitting an upper light. A light guiding element mounts to the upper portion of the housing. The light guiding element is aligned with the upper light source to receive the upper light and direct outgoing light in a diffused light pattern. A display attaches to the upper portion of the housing and aligns with the light guiding element to receive the diffused light pattern for illumination of the display. A lower light source attaches to the lower portion of the housing for emitting a lower light. A lens assembly attaches to the lower portion of the housing. The lens assembly is configured to receive the lower light from the lower light source and direct outgoing light in a focused light pattern.

DETAILED DESCRIPTION OF THE INVENTION

The foregoing summary, as well as the following detailed description of certain embodiments will be better understood when read in conjunction with the appended drawings. As used herein, an element or step recited in the singular and proceeded with the word "a" or "an" should be understood as not excluding plural of said elements or steps, unless such exclusion is explicitly stated. Furthermore, references to "an embodiment" and "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

One or more embodiments disclosed herein include an electrical device for installation in a running board for a vehicle that is configured to provide an upper light assembly for emitting a diffused light pattern in a first direction to backlight a display. For example, an upper light source can attach to a display mount and align with an end of a light guiding element. The light guiding element receives incoming light from the upper light source and directs outgoing light to backlight the display. The electrical device also includes a lower light assembly configured for emitting light through a lens assembly into a focused light pattern in a second direction for illuminating a surface. For example, the lens assembly can include a collimator, an auxiliary lens, and a lower member in a nested arrangement that diffracts, and/or refracts light to emanate the lens assembly as outgoing light in a focused light pattern.

Figure 1:
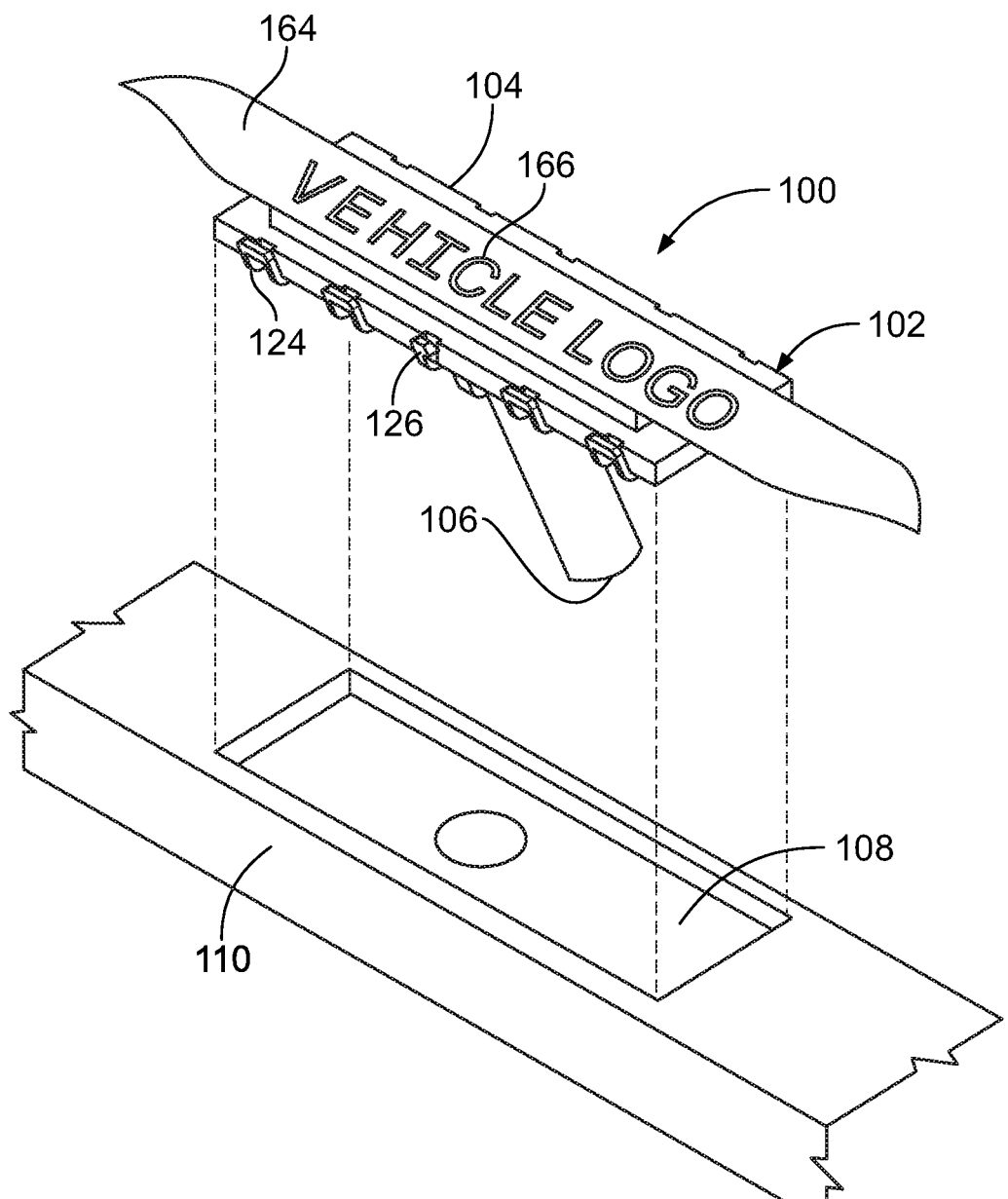
FIG. 1 illustrates a partially exploded perspective view of an electrical device according to an embodiment.

FIG. 1 illustrates a perspective section view of an electrical device 100 according to an embodiment. The electrical device 100 includes a housing 102 with an upper portion 104 and a lower portion 106. As used herein, relative or spatial terms such as "upper", "lower", "top," "bottom," "front," "rear," "left," and "right" are only used to distinguish the referenced elements and do not necessarily require particular positions or orientations of the electrical device 100 relative to the surrounding environment of the electrical device 100. The housing 102 is configured to be inserted into a cavity or recess 108 of a running board 110 of a vehicle (not shown) In alternate embodiments, the housing 102 can be inserted into any a recess of at any location on the vehicle, such as a bumper, a door sill, a spoiler, and the like.

Figure 2:
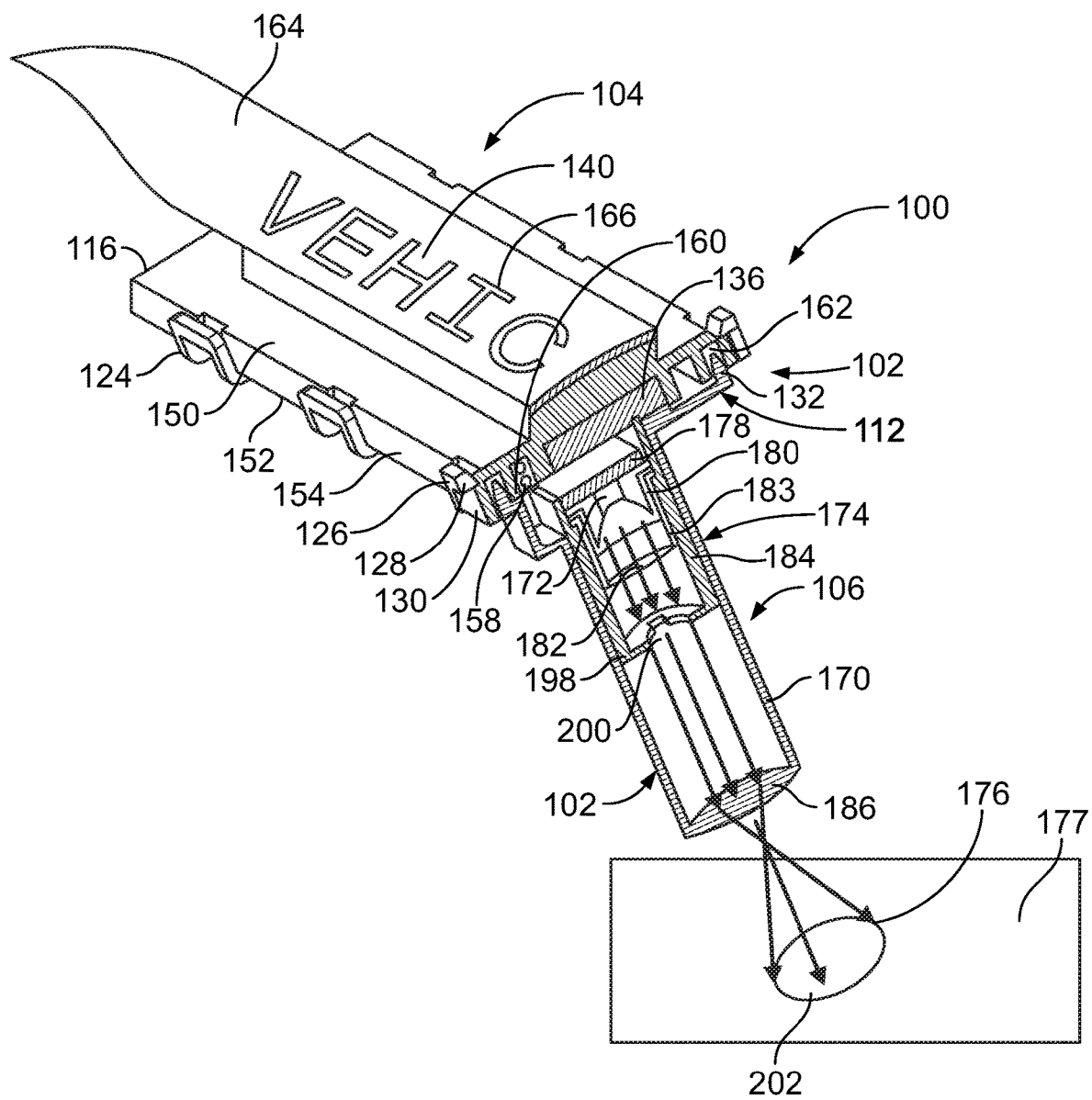
FIG. 2 illustrates a perspective section view of an electrical device according to an embodiment.
Figure 3:
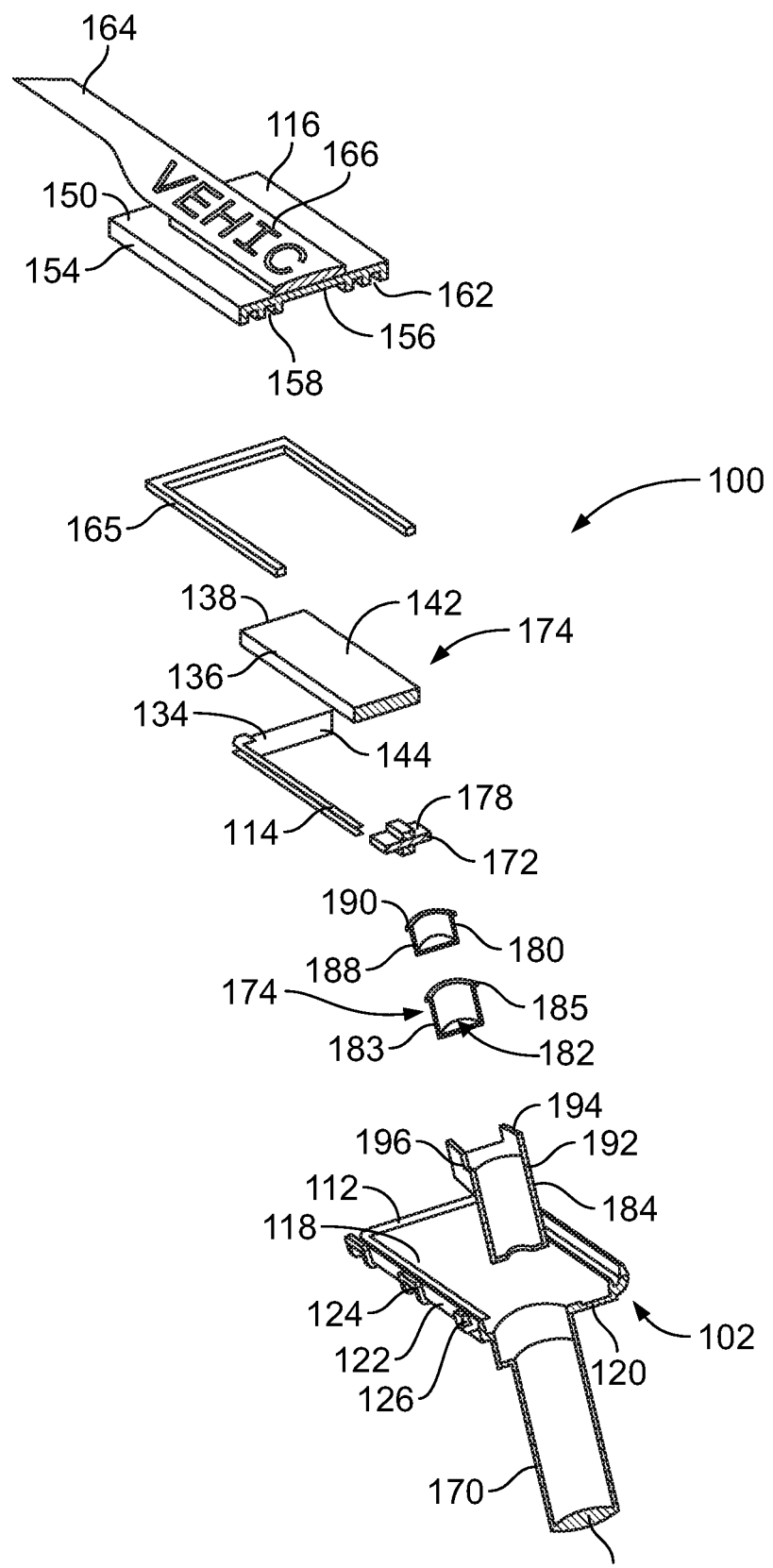
FIG. 3 illustrates an exploded perspective view of the electrical device according to an embodiment.

FIG. 2 illustrates a perspective section view of an electrical device according to an embodiment. FIG. 3 illustrates an exploded perspective view of the electrical device according to an embodiment. The upper portion 104 of the housing 102 is a display mount 112 that is configured for mounting an upper light assembly 114 and a display 116. The display mount 112 is substantially planar and rectangular-shaped having an upper surface 118, a lower surface 120 and an outer peripheral edge 122. A plurality of guide tabs 124 extend upwardly from the edge of the display mount 112. In the embodiment of FIGS. 1-3, four guide tabs 124 are equally spaced about the edge 122. The guide tabs 124 are configured to align the display 116 with the display mount 112. In alternate embodiments, any number and arrangement of guide tabs 124 can be used to align the display 116 with the display mount 112.

A plurality of retaining members 126 extend upwardly from the edge 122 of the display mount 112. The retaining members 126 are configured to secure the display 116 to the display mount 112. In the embodiment of FIG. 1, two retaining members 126 are positioned at about the mid-point of the display mount 112 on opposite sides. In alternate embodiments, any number and configuration of retaining members 126 can be used to secure the display 116 to the display mount 112. Each retaining member 126 includes an upper angled portion 128 that is configure to define a recessed area 130 between the angled portion 128 and the upper surface 118 of the display mount 112. The recessed area 130 is configured to receive a portion of the display 116 for securement of the display 116 to the display mount 112. When attaching the display 112 to the display mount 116, the display 116 presses down on the angled portion 128 to deflect the angled portion 128 outwards. When the display 116 is positioned within the recessed area, the angled portion 128 returns to the default position so that the angled portion 128 is positioned above a portion of the display 116 for securement.

The display mount 112 includes ribs 132 that extend upwardly from the upper surface 118. The ribs 132 are configured to mate with the display 116, as is further described below.

The upper light assembly 114 includes an upper light source 134 mounted to the upper surface 118 of the display mount 112. A light guiding element 136 mounts to the upper surface 118 of the display mount 112 and is aligned with the upper light source 134 positioned adjacent to an end 138 of the light guiding element 136. In alternate embodiment, a second upper light source is positioned adjacent an end of the light guiding element opposite from the first upper light source 134. The light guiding element 136 is a generally rectangular prism that is configured to receive incoming light from the upper light source 134 and direct outgoing light in a first emitting direction 140. Light emitting from the upper light source 134 enters the end 138 of the light guiding element 136 and is directed upwardly through a top surface 142 of the light guiding element 138 in a diffused light pattern. The outgoing light from the light guiding element 138 backlights the display 116. The light guiding element 136 comprises a material such as, plastic, glass, acrylic, silica, polycarbonate, and the like. The light guiding element 136 is composed of a light transmissive material, such as glass, acrylic, polypropylene, polycarbonate, or another polymer.

The upper light source 134 includes a light emitting device mounted to a substrate, such as a printed circuit board (PCB) 144. The upper light source 134 may be a light emitting diode (LED). Optionally, the upper light source 134 may be a monochromatic LED light that emits monochromatic white light. Alternatively, the upper light source 134 may be a tri-color red green blue (RGB) LED that is configured to be able to emit red light, green light, blue light, and/or combinations thereof to create many different colors and shades of light. In alternative embodiments, the upper light source 138 may be an incandescent bulb, a compact fluorescent lamp (CFL) bulb, xenon bulb, halogen bulb, or the like, instead of an LED. The upper light source 134 is configured to emit light to the light guiding element 136.

The upper light source 134 is operatively coupled to a light engine. The light engine includes drivers, controllers, power sources such as batteries, and/or associated circuitry for controlling the optical characteristics of the light generated by the light source 134. At least some of the drivers, controllers, power sources, and/or associated circuitry may be embedded or otherwise contained on the (PCB). The light engine receives power and/or control signals via electrical leads 144 and/or wires that extend remotely to connect to a remote power source and/or controller in the vehicle. The light engine may be joined to a switch that operates the upper light source 134. Although one upper light source 134 is associated with each light engine in the illustrated embodiment, in other embodiments a single light engine may control operation of multiple light sources.

The display 116 is substantially planar and rectangular-shaped having a top surface 150, a bottom surface 152 and a perimeter edge 154. The display 116 is configured with a thickness so that the edge 154 of the display 116 inserts into the recesses 128 of the retaining members 126 for securement to the display mount 112. The bottom surface 152 is configured to define a channel 156 to at least partially enclose the light guiding element 136 and the upper light source 134. The bottom surface 152 is also configured to define a conduit 158 for wires 160 and a circumferential groove 162 for receiving the ribs 132. A bonding material 165, such as adhesive, is disposed within the groove 162 to affix the display 116 to the upper surface 118 of the display mount 112. In other embodiments, the display 116 can affix to the display mount 112 using any suitable material or process, including but not limited to tape, welding, fasteners, and the like.

The display 116 includes a trim element, such as a scuff plate 164, extending along the top of the channel 156. The scuff plate 164 includes openings 166 that align with the top surface 142 of the light guiding element 136. The openings 166 can be configured as desired indicia, such as a logo, design, letter, numbers, symbols or other indicia. Outgoing light from the light guiding element 136 emits through the openings 166, thereby illuminating the indicia.

The lower portion 106 of the housing 102 includes a substantially cylindrical barrel 170 that extends downwardly from the lower surface 120 of the display mount 112. The barrel 170 is configured to receive the lower light source 172 and a lens assembly 174. The lower light source 172 affixes to the top of the lens assembly 174 and is positioned to emit light through the lens assembly 174 and direct outgoing light in a focused light pattern 176 onto a surface 177.

The lower light source 172 includes a light emitting device mounted to a substrate 178. The lower light source 172 may be a light emitting diode (LED). Optionally, the lower light source 172 may be a monochromatic LED light that emits monochromatic white light. Alternatively, the lower light source 172 may be a tri-color red green blue (RGB) LED that is configured to be able to emit red light, green light, blue light, and/or combinations thereof to create many different colors and shades of light. In alternative embodiments, the lower light source 172 may be an incandescent bulb, a compact fluorescent lamp (CFL) bulb, or the like, instead of an LED. The upper light source # is configured to emit light to the light guiding element 136.

The lower light source 172 is operatively coupled to a light engine. The light engine includes drivers, controllers, power sources such as batteries, and/or associated circuitry for controlling the optical characteristics of the light generated by the lower light source 172. At least some of the drivers, controllers, power sources, and/or associated circuitry may be embedded or otherwise contained on the (PCB). The light engine receives power and/or control signals via electrical leads and/or wires that extend remotely to connect to a remote power source and/or controller in the vehicle. The light engine may be joined to a switch that operates the lower light source 172. Although one lower light source 172 is associated with each light engine in the illustrated embodiment, in other embodiments a single light engine may control operation of multiple light sources. For example, a single light engine may control operations of the lower light source 172 and the upper light source 134.

The lens assembly 174 includes a collimator 180, an auxiliary lens 182, and a lower member 184 in a nested arrangement that inserts into the barrel 170. The lens assembly 174 also includes a lens 186 disposed in the end of the barrel 170.

The collimator 180 includes a cylindrical portion 188 having a rim 190 at the upper end so that the collimator can nest within the auxiliary lens 182. The collimator 180 is configured so that incoming light from the lower light source 172 is diffracted and refracted to form a collimated light beam as outgoing light that emanates to the auxiliary lens 182.

The auxiliary lens 182 includes a cylindrical portion 183 having a rim 185 at the upper end so the auxiliary lens can nest within the lower member 184. The auxiliary lens modifies a property of light passing through the lens assembly 174, such as the focal length. In alternate embodiments, the auxiliary lens is not included in the lens assembly 174.

The lower member 184 includes a cylindrical portion 192 having a rim 194 and a counterbore 196 at the upper end. The lower member 184 also includes a bottom surface 198 having an aperture 200. The aperture 200 is configured to receive incoming light from the collimator 180 and emit light through the aperture 200 to form a predetermined image or indicia.

The lens 186 disposed in the end of the barrel 170 receives outgoing light from the lower member 184 and emits outgoing light in a second direction 202 onto the surface 177. The outgoing light from the lower member 184 passing through the lens 186 is diffracted, and/or refracted and exits or emanates from the lens 186 as outgoing light in a focused light pattern. The lens 186 is composed of a light transmissive material, such as glass or acrylic. The lens 186 may be clear and transparent, or at least translucent, to allow the transmission of light.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. § 112, sixth paragraph, unless and until such claim limitations expressly use the phrase "means for" followed by a statement of function void of further structure.

What is claimed is:

1. An electrical device for a vehicle, comprising:
   a housing having a display mount and a lens barrel;
   an upper light source attached to the display mount of the housing for emitting an upper light;
   a light guiding element mounted to the display mount of the housing and aligned with the upper light source to receive the upper light and direct outgoing light in a first emitting direction;
   a display attached to the display mount of the housing and aligned with the light guiding element to receive the outgoing light for illumination of the display;
   a lower light source attached to the lens barrel of the housing for emitting a lower light; and
   a lens assembly attached to the lens barrel of the housing, the lens assembly being configured to receive the lower light from the lower light source and direct outgoing light in a second emitting direction different from the first emitting direction.

2. The electrical device of claim 1, wherein the lens assembly includes a collimator attached to the lens barrel of the housing, the collimator being configured to receive the lower light from the lower light source and change directions of the incoming light received from the lower light source such that the outgoing light emanating from the collimator is a collimated beam; and
   a lens element attached to the lens barrel of the housing, the lens element being configured to receive the collimated beam from the collimator and direct the collimated beam at the target.

3. The electrical device of claim 1, wherein the lens assembly includes an auxiliary lens attached to the lens barrel of the housing and configured to receive the lower light from the lower light source and modify a property of the lower light.

4. The electrical device of claim 1, further comprising a lower member attached to the lens barrel of the housing, the lower member having an aperture configured to direct the lower light to form a predetermined image.

5. The electrical device of claim 1, wherein the upper light source is positioned adjacent to an end of the guide lighting element, and further comprising, an auxiliary upper light source attached to the display mount of the housing and positioned adjacent an opposite end of the guide lighting element.

6. The electrical device of claim 1, further comprising a light driver electrically coupled to the upper light source and the lower light source for controlling operation thereof, the light driver receiving a control signal from the vehicle to operate the upper light source and the lower light source.

7. The electrical device of claim 1, further comprising a light driver having an input from the vehicle electrically coupled to a first printed circuit board and a second printed circuit board, the upper light source being electrically couple to the first printed circuit board, and the lower light source being electrically coupled to the second printed circuit board.

8. The electrical device of claim 1, wherein the lower light source is positioned directly below the light guiding element, the lower light source is configured to direct light downwardly, and the light guiding element is configured to direct light upwardly.

9. The electrical device of claim 1, wherein the light guiding element emits a diffused light pattern to backlight the display.

10. The electrical device of claim 1, wherein the lower light source emits a focused light pattern.

11. An electrical device for a vehicle, comprising:
a housing having an upper portion and a lower portion;
an upper light source attached to the upper portion of the housing for emission of an upper light;
a light guiding element attached to the upper portion of the housing and configured to receive the upper light from the upper light source and direct outgoing light in a substantially uniform direction;
a display attached to the upper portion of the housing and configured to receive the outgoing light from the light guiding element for illumination of the display;
a lower light source attached to the lower portion for emission of a lower light;
a collimator attached to the lower portion and configured to receive incoming light from the lower light source and change directions of the incoming light received from the lower light source such that the outgoing light emanating from the collimator is a collimated beam; and
a lens element attached to the lower portion of the housing and configured to receive the collimated beam from the collimator and direct the collimated beam at a target.

12. The electrical device of claim 11, further comprising an auxiliary lens attached to the lower member and configured to receive the collimated beam from the collimator and modify a parameter of the collimated beam.

13. The electrical device of claim 11, wherein the lower member includes an aperture configured to direct the collimated beam to form an image.

14. The electrical device of claim 11, wherein the housing includes a mounting flange configured for attachment to a vehicle running board.

15. The electrical device of claim 11, further comprising a trim element coupled to an upper surface of the display, the trim element having at least one opening that exposes the display.

16. The electrical device of claim 11, wherein the upper light source and the lower light source are configured for electrical connection to a vehicle control circuit for operational control of the upper light source and lower light source.

17. The electrical device of claim 11, further comprising a light driver attached to the housing and electrically connected to the upper light source and the lower light source for operational control of the upper light source and the lower light source.

18. The electrical device of claim 11, wherein the upper light source is positioned adjacent to an end of the light guiding element, and further comprising, a second upper light source attached to the upper portion of the housing and positioned adjacent an opposite end of the guide lighting element, the light guiding element receiving light from the upper light source and the second upper light source.

19. A lighting assembly for a vehicle running board, comprising:
a housing having an upper portion and a lower portion;
an upper light source attached to the upper portion of the housing, the upper light source being configured for emitting an upper light;
a light guiding element mounted to the upper portion of the housing, the light guiding element being aligned with the upper light source to receive the upper light and direct outgoing light in a diffused light pattern;
a display attached to the upper portion of the housing and aligned with the light guiding element to receive the diffused light pattern for illumination of the display;
a lower light source attached to the lower portion of the housing for emitting a lower light; and
a lens assembly attached to the lower portion of the housing, the lens assembly being configured to receive the lower light from the lower light source and direct outgoing light in a focused light pattern.

20. The electrical device of claim 19, further comprising a lower member attached to the lower portion of the housing, the lower member having an aperture configured to direct the lower light to form a predetermined image.

* * * * *